(12) United States Patent
Wei et al.

(10) Patent No.: US 9,398,098 B2
(45) Date of Patent: Jul. 19, 2016

(54) CUSTOMER PREMISE EQUIPMENT AND METHOD OF REMOTE LOGIN

(71) Applicant: HON HAI PRECISION INDUSTRY CO., LTD., New Taipei (TW)

(72) Inventors: Ya-Ti Wei, New Taipei (TW); Tien-Ting Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 258 days.

(21) Appl. No.: 14/264,811

(22) Filed: Apr. 29, 2014

(65) Prior Publication Data

US 2015/0256625 A1    Sep. 10, 2015

(30) Foreign Application Priority Data

Mar. 10, 2014   (TW) .............................. 103108268 A (51) Int. Cl.
*H04L 12/28* (2006.01)
*H04L 12/24* (2006.01)
(Continued)

(52) U.S. Cl.
CPC .......... *H04L 67/141* (2013.01); *H04L 12/2856* (2013.01); *H04L 12/2898* (2013.01);
(Continued)

(58) Field of Classification Search
CPC ..... H04L 29/06; H04L 47/10; H04L 12/2602; H04L 12/2856; H04L 43/00; H04L 69/16; H04L 41/0213; H04L 45/00; H04L 47/2408; H04L 69/161; H04L 69/163; H04L 12/189; H04L 12/5695; H04L 45/10; H04N 21/64322; H04N 21/6125; H04N 21/6118; H04N 21/6168; H04N 21/812; H04N 21/2221; H04N 21/25816; H04N 21/42208; H04N 21/42209; H04N 41/43615; H04N 21/443; H04N 21/47202; H04N 21/47217
USPC ......... 709/223, 224, 226, 220, 229, 225, 227, 709/230, 203, 228; 370/352, 401, 389, 235, 370/392, 395.1, 468, 252, 338, 395.21; 710/10, 11, 15, 2, 3, 33, 62, 8
See application file for complete search history.

(56) References Cited

U.S. PATENT DOCUMENTS

2005/0281256 A1*  12/2005  Taipale ............. H04L 29/12377
                                                          370/389
2006/0050862 A1*   3/2006  Shen ................... H04L 12/2856
                                                          379/219
(Continued)

FOREIGN PATENT DOCUMENTS

CN    100486176 C    5/2009
CN    102055659      5/2011
(Continued)

OTHER PUBLICATIONS

Author unknown, Telnet Commands, Jan. 27, 2010, TechNet, pp. 1-10 https://technet.microsoft.com/en-us/library/bb491013.aspx.*

*Primary Examiner* — Patrice Winder
*Assistant Examiner* — Abderrahmen Chouat
(74) *Attorney, Agent, or Firm* — ScienBiziP, P.C.

(57) ABSTRACT

A customer premise equipment (CPE) communicates with both lower-layer and upper-layer network within the LAN that communicates with an ISP server. The CPE searches other CPEs after receiving commands from the upper-layer network and makes port configuration after receiving commands from the upper-layer network, and also configures the default telnet port according to the port number receiving from the upper-layer network. Then the CPE establishes remote communications via the default telnet port with the ISP server. Finally the CPE disabling module disables the telnet service and releases the default telnet port after receiving commands from upper-layer network.

12 Claims, 9 Drawing Sheets

(51) Int. Cl.
    *H04L 29/06*     (2006.01)
    *G06F 15/177*    (2006.01)
    *H04L 29/08*     (2006.01)

(52) U.S. Cl.
    CPC ........ *H04L41/0803* (2013.01); *H04L 41/0806* (2013.01); *H04L 41/0893* (2013.01); *H04L 63/0236* (2013.01); *H04L 65/1069* (2013.01); *H04L 67/34* (2013.01)

(56) References Cited

U.S. PATENT DOCUMENTS

2008/0181240 A1* 7/2008 Jiang .................. H04L 12/2602
                                                    370/401
2009/0219820 A1  9/2009 Acke et al.
2010/0103941 A1* 4/2010 Jiang .................. H04L 12/2825
                                                    370/400
2015/0169330 A1* 6/2015 Maity .................. G06F 9/4401
                                                    713/1
2015/0180753 A1* 6/2015 Wei .................... H04L 12/2644
                                                    370/242

FOREIGN PATENT DOCUMENTS

| CN | 102123050 A | 7/2011 |
| TW | 200509610 A | 3/2005 |
| TW | 201327206 A | 7/2013 |

* cited by examiner

| CPE in the low-layer network | CPE 102 | CPE103 | CPE 104 |
|---|---|---|---|
| Number | 1 | 0 | 3 |
| Port number assigned | 344 | / | 341 |

FIG. 8

| Original destination address | Destination address after transfer |
|---|---|
| 10.130.130.21:341 | 192.168.1.101:341 |
| 10.130.130.21:342 | 192.168.1.101:342 |
| 10.130.130.21:343 | 192.168.1.101:343 |
| 10.130.130.21:344 | 192.168.1.102:344 |

FIG. 9

CUSTOMER PREMISE EQUIPMENT AND METHOD OF REMOTE LOGIN

FIELD

Embodiments of the present disclosure generally relate to network communication, and more particularly to customer premise equipment (CPE) into which an Internet service provider (ISP) can login remotely via port assigned randomly and remote login methods.

BACKGROUND

Network devices are applied and needed in a plurality of networks. Customers enjoy a plurality of services from different ISPs via many CPEs, the CPEs being maintained, configured, and updated by the ISP as part of their management function. In general, when an ISP needs to upgrade or configure its CPE, it can telnet the CPE to login in and manage the CPE as long as the IP address of the CPE is accessible by the ISP. However, now it is more difficult for many ISPs to get the IP address of most CPEs directly even if the CPEs are under the management of the ISPs because more and more companies today are using private addresses within the LAN and communicate with internet via a network address translation (NAT) server. This causes difficulties for the ISP to manage the CPEs. In addition, it is difficult for one ISP to identify the quantity of CPE belonging to itself and confusion may occur between CPEs that belongs to different ISPs. Meanwhile, the default telnet port is generally fixed at Port 23, which may also bring potential security vulnerabilities.

It is desirable to provide a CPE into which an ISP can login remotely via telnet port assigned randomly, and method of remote login to solve the problems mentioned above.

DETAILED DESCRIPTION

The embodiments herein are illustrated by way of example and not by way of limitation in the figures of the accompanying drawings, in which like reference numerals indicate similar elements. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that modules may comprise connected logic modules, such as gates and flip-flops, and may comprise programmable modules, such as programmable gate arrays or processors. The modules described herein may be implemented as either software and/or hardware modules and may be stored in any type of computer-readable medium or other computer storage device.

Figure 1:
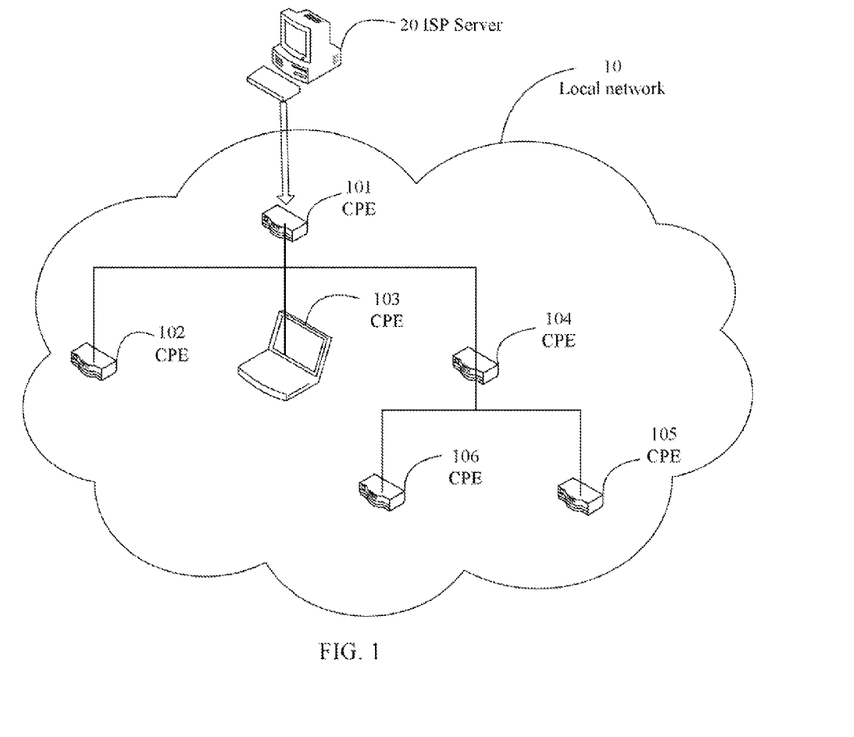
FIG. 1 is a diagrammatic view of an application environment of a CPE, showing one example of operation of the application environment.

FIG. 1 is a diagrammatic view of an application environment of a CPE. In one embodiment, CPEs 101-106 are located in LAN 10 while an ISP server 20 is located outside an LAN 10. The ISP server 20 provides services for some or all of the CPEs in LAN 10 and manages those CPEs that accept the services. Many CPEs within LAN 10 form a multi-layer network. In the multi-layer network, CPE 101 is the first layer as well as a root CPE, CPEs 102-104 are located on the second layer of the network, while CPEs 105 and CPE 106 are located in the third layer, which is also the bottom layer of the multi-layer network.

In at least one embodiment, CPEs 101-106 within LAN 10 can be any network devices with functions of DHCP and NAT, such as router, switch, or personal computer. These are examples only and not as a limitation to the present disclosure. LAN 10 communicates with a public internet via NAT and the root CPE (CPE 101) of LAN 10 also acts as a NAT host. The root CPE make NAT transfers for the communication package between devices within LAN 10 and the Internet. Each CPE can be a NAT host to other CPEs under it in the multi-layer network, which can assign ports for other CPEs and make NAT transfers when necessary.

In at least one embodiment, the CPEs being located in LAN 10 does not mean that the CPE should accept service provided by ISP server 20. If one CPE does not accept the service from ISP server 20, the CPE is regarded as being out of the management of ISP server 20. In the application environment showing in FIG. 1, in order to understand and describe the present disclosure more conveniently, it is assumed that all CPEs except CPE 103 are managed by ISP server 20 and accept service provided by ISP server 20. For CPEs that are managed by ISP server 20, those CPEs are regarded as belonging to ISP server 20. Besides, as CPE 101 is the root CPE of the multi-layer network and is located at the top layer, CPE 101 communicates with ISP server 20 directly and ISP server 20 is considered as "upper-layer network" of CPE 101 even though ISP server 20 is outside LAN 10.

In general, when ISP server 20 needs to manage one CPE in LAN 20 that belongs to ISP server 20, for example, to upgrade one CPE, ISP server 20 can telnet the destination CPE and make operation to the CPE accordingly.

Figure 2:
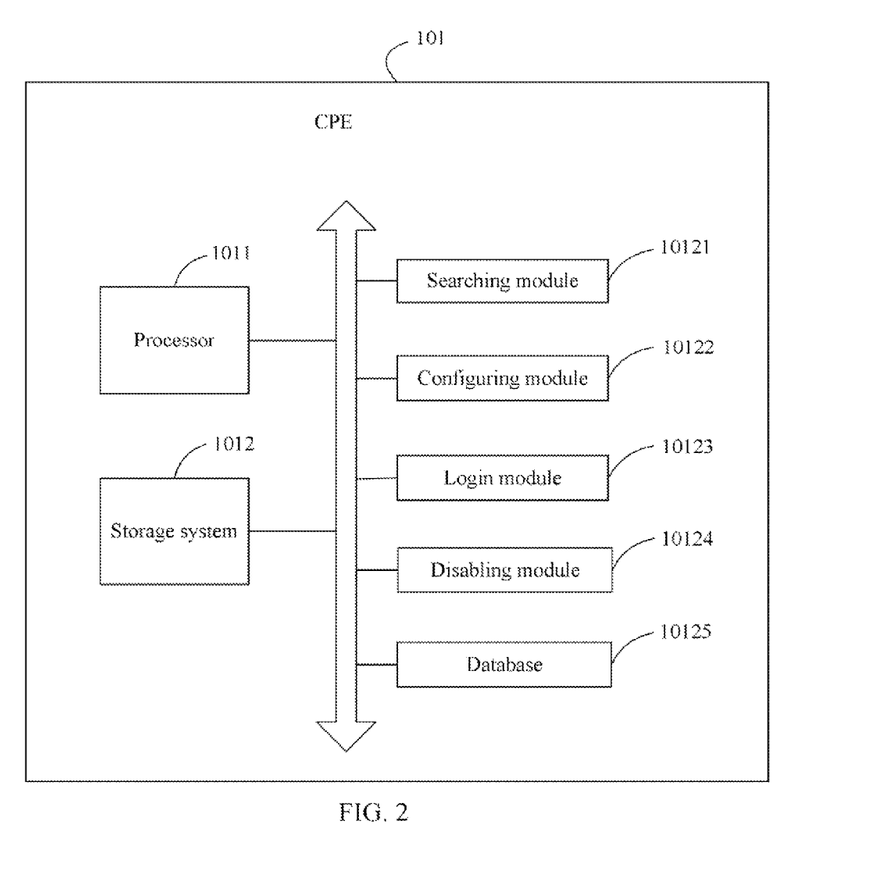
FIG. 2 is a block diagram of functional modules of a CPE in FIG. 1.

FIG. 2 is a block diagram of functional modules of one CPE in FIG. 1. Hereafter taking CPE 101 as an example, CPE 101 includes a searching module 10121, a configuring module 10122, a login module 10123, a disabling module 10124, a database 10125, at least one processor 1011, and a storage system 1012. The modules 10121-10124 may include computerized code in the form of one or more programs that are stored in the storage system 1012. The computerized code includes instructions that are executed by the at least one processor 1011 to provide functions for the modules 10121-10124. In at least one example, the storage system 1012 may include a hard disk drive, a flash memory, and a cache or another computerized memory device.

The searching module 10121 accepts authentication from the upper-layer network and authenticates other CPEs in the low-layer network, and performs a search function to confirm the number of CPEs that belong to ISP server 20 in the low-layer network. When the searching module 10121 receives an authentication request from ISP server 20, it sends a pre-allocated user name and password to ISP server 20 and continues to wait after a successful authentication. When receiving searching command from ISP server 20, if there are other CPEs underlying CPE 101, then the searching module 10121 send all CPEs that are located at the second layer of the network requirements for authentication, to verify whether any CPE does belong to ISP server 20. When CPE belonging to ISP server 20 exists at the second layer of the network, for example, CPE 102 and CPE 104, the search module 10121 sends CPE 102 and CPE 104 search command and will start a timer that is preset by ISP server 20 when sending command. The interval diminishes by layer in LAN 10, for example, at the first layer of the network, it is time T, then changes to time T/2 at the second layer of the network, and correspondingly for deeper layers. CPE 102 and CPE 104 will return their result of search including number of CPEs belonging to ISP server 20 to the searching module 10121 to confirm the number of CPEs belonging to ISP server 20 after they receive searching command and finish searching in their low-layer network. The searching module 10121 then forwards result of search in relation to CPE 101 to ISP server 20 after integration of all the results of search received from other CPEs, in detail, the result of search of CPE 101 equals to all search number received plus 1. The result of search of each CPE in LAN 10 is explained below to make the searching process better understood:

For CPE 102, no other CPE is lower than CPE 102 in the network, so the result of search in relation to CPE 102 is returned to the searching module 10121 as 1, validating that only CPE 102 itself belongs to ISP server 20.

For CPE 104, as CPE 105 and CPE 106 are located under CPE 104 at the third layer of the network and both of them belong to ISP server 20, the result of search in relation to CPE 104 which is returned to the searching module 10121 is shown as 3, validating that there are 3 CPEs belonging to ISP server 20, including CPE 104, CPE 105, and CPE 106.

For CPE 103 that does not belong to ISP server 20, the searching number defaults to 0 because CPE 103 could not receive search command.

For CPE 101, the searching module 10121 receives 1 from CPE 102 and 3 from CPE 104 respectively. Together with 0 default for CPE 103 and considering CPE 101 itself as 1, the result of search is that the searching module 10121 returns to ISP server 20 the number 5.

Figure 9:
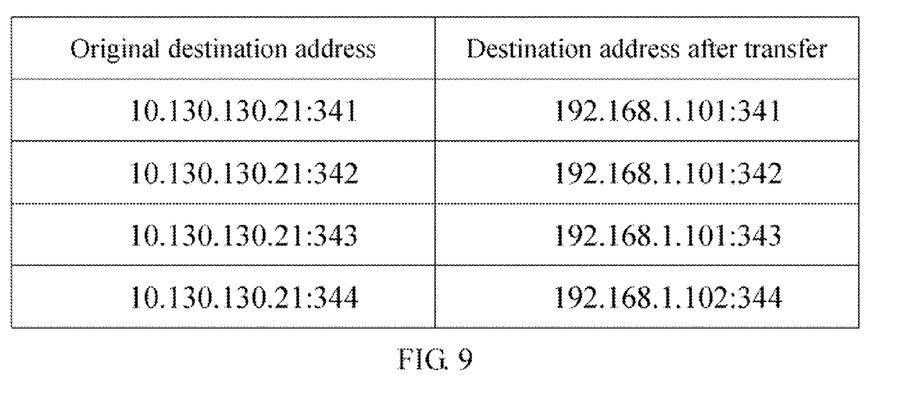
FIG. 9 is a diagram of one embodiment of destination address transferred by a CPE in FIG. 1, showing an example of the destination address before and after transfer.

In at least one embodiment, the result of search that the searching module 10121 received from the low-layer network can be record in a table, for example, the table in FIG. 9, which is only an example and not as a limitation to the present disclosure. All results of search of each CPE is stored in database 10125 for future reference.

In the present embodiment, the searching module 10121 persistently monitors any reply from CPEs at the second layer that belong to ISP server 20 until the timing period is finished and returns the result of search of CPE 101 to ISP server 20.

In the present embodiment, the searching module 10121 returns the result of search equal to 1 to ISP server 20 when no CPEs in the low-layer network are authorized successfully or when no CPEs belonging to ISP server 20 are found after searching, validating that only CPE 101 itself belongs to ISP server 20 in LAN 10.

The configuring module 10122 allocates ports for other CPEs belonging to ISP server 20 in the low-layer network and configures ports. After receiving the result of search returned from the searching module 10121, ISP server 20 randomly assigns a port for CPE 101, then sends "open port send" command to CPE 101 together with the assigned port number, requiring CPE 101 to allocate other ports for other CPEs that belong to ISP server 20 at low-layer network of CPE 101 layer. After receipt of the port number assigned for CPE 101 and the "open port send" command, the configuring module 10122 assigns other ports for CPEs (CPE 102 and CPE 104) that belong to ISP server 20 at the second layer, according to the result of search received by the searching module 10121 before and the port number assigned for CPE 101. After port distribution has finished, the configuring module 10122 sends "open port send" command to CPEs (CPE 102 and CPE 104) that belong to ISP server 20 at the second layer, together with different port numbers assigned for the CPE 102 and CPE 104, requiring CPE 102 and CPE 104 to allocate other ports for CPEs that belong to ISP server 20 at the third layer. The port assignment and configuration continues similarly until a CPE is located at the bottom of the network. For a CPE that belongs to ISP server 20 located at the bottom of the network, the telnet service is activated of itself, the default telnet port according to assigned port number for it is configured after received related command and information from a CPE at the upper-layer network. After that, the CPE that belongs to ISP server 20 located at the bottom of the network responds to a CPE at the upper-layer network with "open port response", reporting port distribution and self-configuration. After receiving "open port response", a CPE at the upper-layer network activates the telnet service and activates port forwarding, configures port and responds to the upper-layer network, which is similar with the process described above. The port distribution and configuration of each CPE belonging to ISP server 20 is reported layer by layer from the bottom to the top until CPE 101 receives "open port response." For CPE 101, the configuring module 10122 activates the telnet service and port forwarding after receiving "open port response" from CPE 102 and CPE 104, and then configures the default telnet port according to assigned port number for CPE 101. The port-forwarding rule of CPE 101 is: the forwarding of all packages whose destination port matches with any default telnet port of other CPEs that belong to ISP server 20 in the low-layer network. For other CPEs such as CPE 102, the port forwarding is similar to that of CPE 101. After configuration has finished, the configuring module 10122 sends "open port response" as a reply to ISP server 20, reporting port distribution and configuration of all CPEs that belong to ISP server 20 in LAN 10.

In detail, port distribution and configuration of CPEs that belong to ISP server 20 in LAN 10 is as follows:

If ISP server 20 assigns port 340 to CPE 101, the port numbers that the configuration module 10122 assigns for CPE 102 and CPE 104 can be 341, 342, or 343, and so on. The port number which each CPE finally gets is decided by the result of search reported and the port number is incremented sequentially and assigned based on the MAC address of each CPE. For example, the result of search that CPE 102 originally reports is 1 while CPE 104 reports 3, and the MAC address of CPE 102 is greater than that of CPE 104, based on the information above, thus the port number assigned to CPE 104 is 340+1=341 and the port number assigned to CPE 102 is 340+1+3=344. Corresponding to CPE 101, CPE 104 assigns port 342 for CPE 105 and port 343 for CPE 106. Each port assigned is then configured as the default telnet port of each CPE correspondingly. For CPE 101, the port-forwarding rule is: the forwarding of packets whose destination port is in the range of 341-344, other CPEs must refer to CPE 101.

In the present embodiment, port distribution and configuration of all CPEs, as well as the port forwarding rules, are stored in database 10125 for future reference.

The login module 10123 helps ISP server 20 to telnet a CPE remotely when receives telnet request from ISP server 20. Continuing hereafter with CPE 101 as an example, the login module 10123 monitors any telnet request from the upper-layer network (ISP server 20) via the default telnet port of CPE 101 and determines whether the telnet request is sent to CPE 101 or not. When the destination port of the telnet request packet matches with the default telnet port (port 340) of CPE 101, it is considered that this telnet request is sent to CPE 101. In other words, when the destination port of the telnet request packet is 340, it is validated that ISP server 20 requires to telnet CPE 101. Thus, the login module 10123 receives this telnet request from ISP server 20 via port 340 to accept login of ISP server 20 so that ISP server 20 can manage CPE 101. If the port match fails, the login module 10123 forwards the telnet request based on the port forwarding rules of CPE 101 (forwarding packets whose destination port is in the range of 341-344) until the telnet request packet reaches a CPE corresponds to the destination port of the telnet request packet. For example, assuming that CPE 101 communicates with the external Internet via an external IP address of 10.130.21, and the internal IP address for CPE 102 and CPE 104 are 192.168.1.102 and 192.168.1.101 respectively. When ISP server 20 wants to telnet a CPE in LAN 20, the destination address of the telnet request packet is the external IP of CPE 101 with the default telnet port of the required CPE. When the telnet request packet arrives at CPE 101, the login module 10123 forwards the telnet request based on the port forwarding rules after determination, thus going through a destination address conversion process based on the port distribution and configuration of all CPEs. FIG. 10 shows an example of a list of destination address conversions of CPE 101 but not as a limitation to the present disclosure. For example, ISP server 20 sends a telnet request packet with destination address of 10.130.21:343 when the required CPE is CPE 106, whose default telnet port is 343. The login module 10123 can covert the original destination address to 192.168.1.101:343 according to table in FIG. 10, then forward the telnet request packet to CPE 104. CPE 104 will forward the telnet request packet to CPE 106 according to its port forwarding rules and destination address conversion table after determination. Finally, the telnet request with destination address of 10.130.21:343 arrives at CPE 106 so that CPE 101 can communicate with ISP server 20 via a telnet link.

The disabling module 10124 can disable the telnet service and reset the original port configuration to release the corresponding ports after receiving command from the upper-layer network. Still taking CPE 101 as an example, when CPE 101 receives "disable telnet send" command from ISP server 20 indicating to all CPEs that belong to ISP server 20 to disable the telnet service, the disabling module 10124 disables telnet service of CPE 101, and releases the original default telnet port 340. At the same time, the disabling module 10124 forwards "disable telnet send" command to CPE 102 and CPE 104, indicating to them that the telnet service should be disabled as well as resetting the original port configuration to release the corresponding port, which is similar to the procedure for CPE 101. After CPE 102 and CPE 104 complete the operation, they send "telnet disabled response" to CPE 101 as a reply informing that the appropriate action has been completed. The disabling module 10124 closes port forwarding and sends "disable telnet response" as a reply to ISP server 20 after receiving replies from CPE 102 and CPE 104, informing ISP server 20 that all CPEs belonging to ISP server 20 have disabled the telnet service and the original port configuration has lapsed. In the present embodiment, other CPEs belonging to ISP server 20 operate in the same way as CPE 101 after receiving "disable telnet send" command from the upper-layer network of each one. The only difference is that CPEs in the bottom network have no need to forward "disable telnet send" nor to close port forwarding because it never opened port forwarding.

Figure 3:
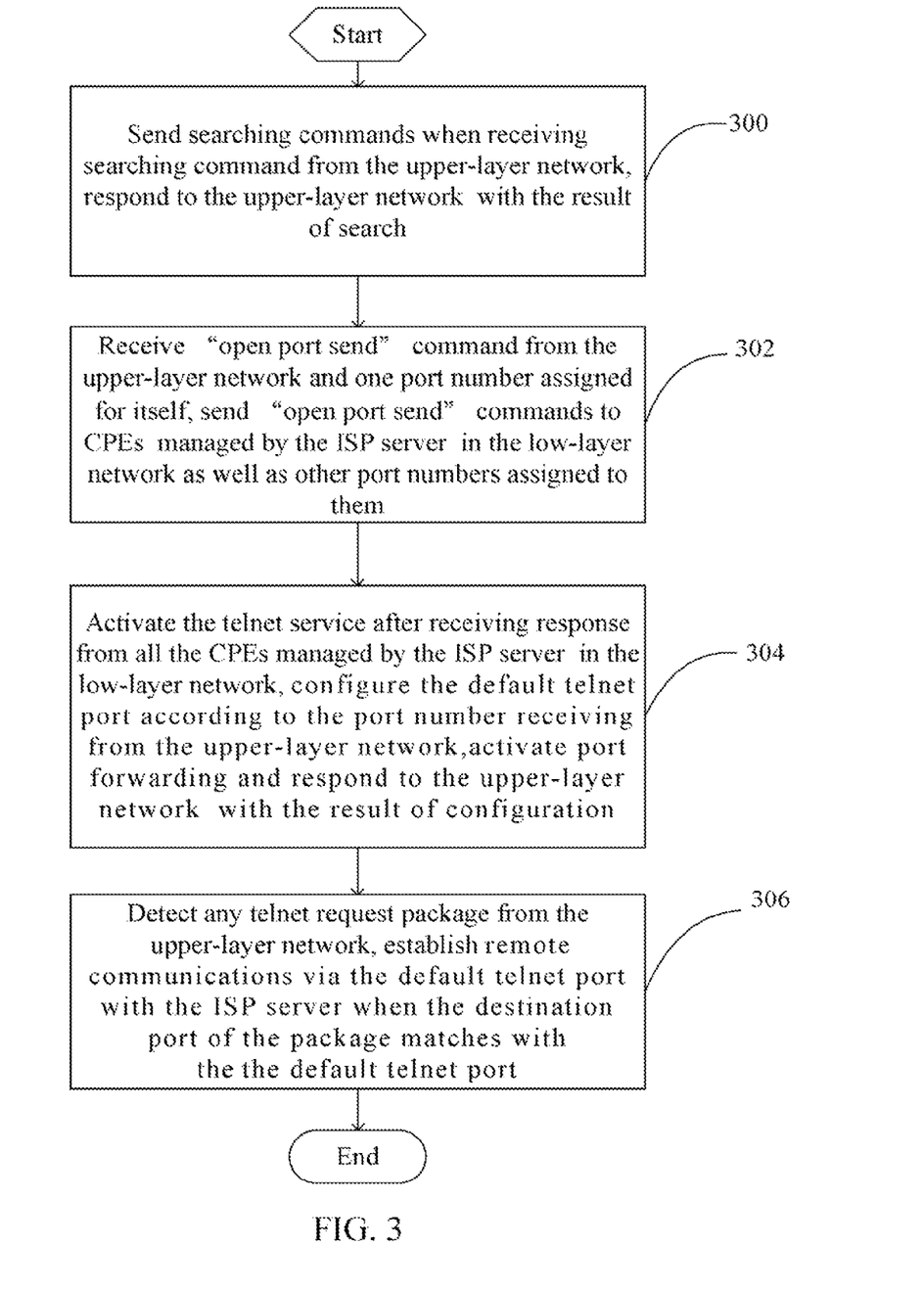
FIG. 3 is a flowchart of one embodiment of a method of remote login.

Referring to FIG. 3, this is a flowchart of one embodiment of a method of remote login. In the described embodiment, the method is carried out in the application environment illustrated in FIG. 1, and is executed by (inter alia) the modules described in FIG. 2. Hereafter, CPE 101 is taken as an example for the detailed operation:

In block 300, when receiving searching command from ISP server 20, the searching module 10121 of authorized CPE 101 sends all CPEs that are located at the second layer of the network requirements for authentication to verify whether any CPE does belong to ISP server 20. When CPEs belonging to ISP server 20 exist at the second layer of the network, the search module 10121 send search command to them and waiting for reply. CPEs belonging to ISP server 20 that are located at the second layer will return their results of search including number of CPEs belonging to ISP server 20 to the searching module 10121 to confirm the number of CPEs belonging to ISP server 20 after they finish searching in their low-layer network. The searching module 10121 then responds result of search in relation to CPE 101 to ISP server 20 after integration of all the result of search received from other CPEs, in detail, the result of search in relation to CPE 101 equals to all search number received plus 1.

In block 302, ISP server 20 randomly assigns a port 340 for CPE 101, and then sends "open port send" command to CPE 101 together with the assigned port number, requiring CPE 101 to allocate other ports for CPEs that belong to ISP server 20 in LAN 20. After receipt of the port number assigned for CPE 101 and the "open port send" command, the configuring module 10122 assigns other ports, for example, port 344 and port 341, for CPE 102 and CPE 104 that belong to ISP server 20 at the second layer, according to the result of search received by the searching module 10121 before and port 340 assigned for CPE 101. After port distribution has finished, the configuring module 10122 sends "open port send" command to CPE 102 and CPE 104 together with port numbers assigned to CPE 102 (port 344) and CPE 104 (port 341), requiring CPE 102 and CPE 104 to allocate other ports for CPEs that belong to ISP server 20 at the third layer. CPE 102 and CPE 104 then finish corresponding port distribution and configuration, which is similar to that of CPE 101, and respond to the configuring module 10122 with "open port response" command, reporting port distribution and configuration of all CPEs locates under the second-layer network.

In block 304, the configuring module 10122 activates the telnet service and port forwarding after receiving "open port response" from CPE 102 and CPE 104, as well as configures the default telnet port as port 340, according to assigned port number for CPE 101. The port-forwarding rule of CPE 101 is: the forwarding of all packages whose destination port matches with any default telnet port of other CPEs that belong to ISP server in the low-layer network. After configuration has finished, the configuring module 10122 sends "open port response" as a reply to ISP server 20, reporting port distribution and configuration of all CPEs that belong to ISP server 20 in LAN 10.

In block 306, the login module 10123 monitors any telnet request from ISP server 20 via the default telnet port of CPE 101 (port 340) and determines whether the telnet request is sent to CPE 101 or not. When the destination port of the telnet request packet matches with port 340, this telnet request is considered sent to CPE 101. In other words, when the destination port of the telnet request packet is 340, it is validated that ISP server requires to telnet CPE 101. Thus, the login module 10123 receives this telnet request from ISP server 20 via port 340 to accept login of ISP server 20, establishing remote communication with ISP server 20 so that ISP server 20 can manage CPE 101.

Figure 4:
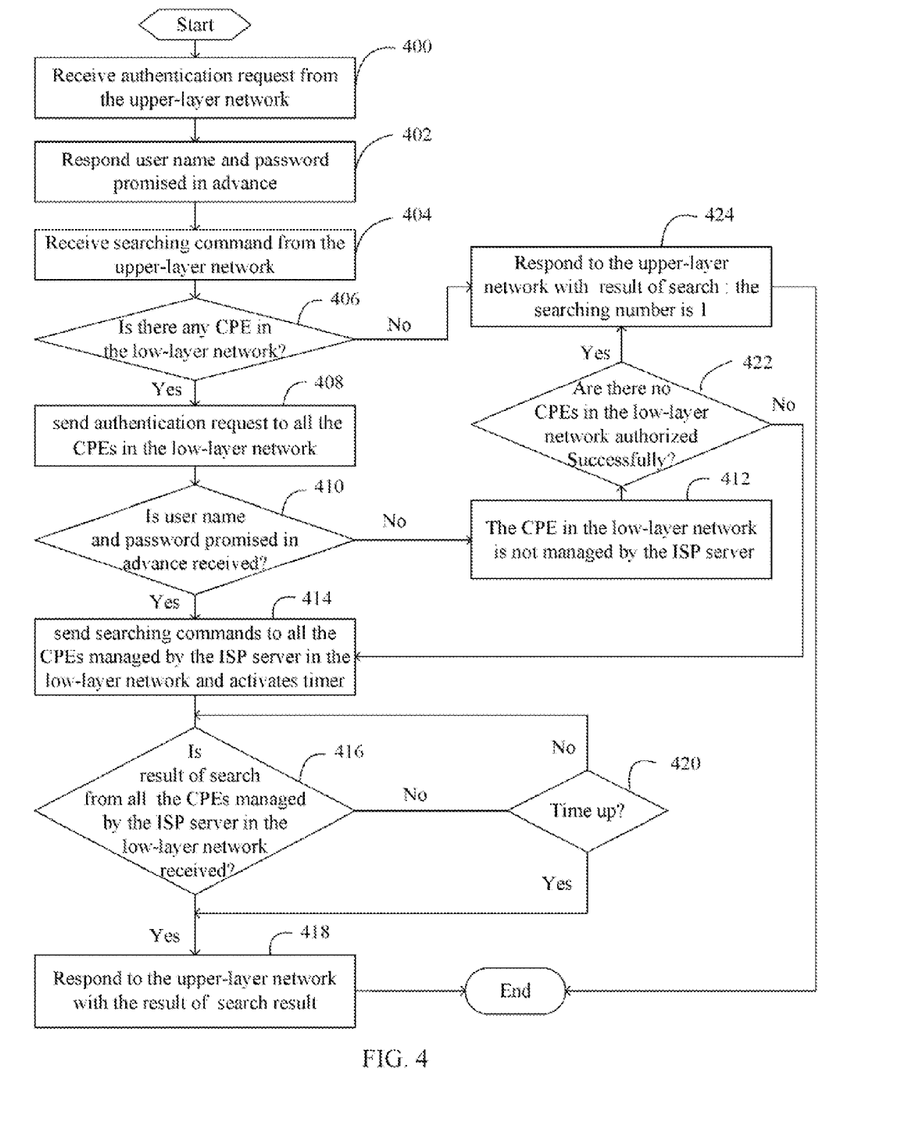
FIG. 4 is a flowchart of one embodiment of searching CPEs; the flowchart gives details of block 300 in FIG. 3.

Referring to FIG. 4, this is a flowchart of one embodiment of searching CPEs, the flowchart is details of block 300 in FIG. 3. In the described embodiment, the method is carried out in the application environment illustrated in FIG. 1, and is executed by (inter alia) the modules described in FIG. 2.

In blocks 400, 402 and 404, when the searching module 10121 receives an authentication request from ISP server 20, it sends a pre-promised user name and password to ISP server 20 and continues to wait after a successful authentication. When receiving searching command from ISP server 20, the searching module 10121 begins to search to affirm the number of CPEs belonging to ISP server 20 in LAN 10.

In block 406, the searching module determines whether there are other CPEs under CPE 101. If there are other CPEs that are located at the second layer network, then in block 408 the searching module 10121 sends all CPEs that are located at the second layer of the network requirements for authentication, to verify whether any CPE does belong to ISP server 20. If there are no other CPEs that are located at the second-layer network, then in block 424, the searching module 10121 returns the result of search that equals to 1 to ISP server 20, validating that only CPE 101 itself belongs to ISP server 20 in LAN 10.

In block 410, if the searching module 10121 receives pre-promised username and password from CPEs that are located at the second layer network, it can be validated that CPE that belongs to ISP server 20 exists in the low-layer network. In the present embodiment, they are CPE 102 and CPE 104. If one CPE at the second layer network never sends pre-promised username and password or the content it sends can not be acknowledged, then in block 412, the CPE is considered not belonging to ISP server 20.

In block 414, the searching module 10121 sends CPE 102 and CPE 104 search command and will start a timer that is preset by ISP server 20 when sending command. The interval diminishes by layer in LAN 10, for example, at the first layer of the network, it is time T, then changes to time T/2 at the second layer of the network, and corresponding for deeper layers.

In block 416, the searching module 10121 monitors whether CPE 102 and CPE 104 returns any result of search or not, which including number of CPEs belonging to ISP server 20. If yes, the process will continue as described in block 418. If not, the searching module 10121 persistently monitors until the timer ends and continue as described in block 418 to avoid endless searching.

In block 418, the searching module 10121 then responds to ISP server 20 with result of search in relation to CPE 101 after integration of all the result of search it receives from other CPEs, in detail, the result of search in relation to CPE 101 equals to all search number received plus 1. Moreover, the searching module 10121 makes a record of all the search number received and default the search number of CPE that doesn't belong to ISP server 20 as 0, such as CPE 103. The table in FIG. 9 is an example but not as a limitation to the present disclosure.

In block 424, the searching module 10121 returns the result of search that equals to 1 to ISP server 20 when no CPEs in the low-layer network is authorized successfully, validating that only CPE 101 itself belongs to ISP server 20 in LAN 10.

As the application environment shown in FIG. 1, all CPEs belong to ISP server 20 except CPE 103, according to the method shown in FIG. 4, the result of search that ISP server 20 receives from CPE 101 should be 5. This result is delivered layer by layer as follows:

For CPE 102, no other CPE is lower than CPE 102 in the network, so the result of search in relation to CPE 102 is returned to the searching module 10121 as 1, validating that only CPE 102 itself belongs to ISP server 20.

For CPE 104, as CPE 105 and CPE 106 are located under CPE 104 at the third layer of the network and both of them belongs so that the result of search in relation to CPE 104 which is returned to the searching module 10121 is shown as 3, validating that there are 3 CPEs belongs to ISP server 20, including CPE 104, CPE 105 and CPE 106.

For CPE 103 that doesn't belong to ISP server 20, the searching number defaults to 0 because CPE 103 could not receive search.

Thus, for CPE 101, the searching module 10121 receives 1 from CPE 102 and 3 from CPE 104 respectively. Together with 0 default for CPE 103 and considering CPE 101 itself as 1, the result of search is that that the searching module 10121 finally returns to ISP server 20 the number 5.

Figure 5:
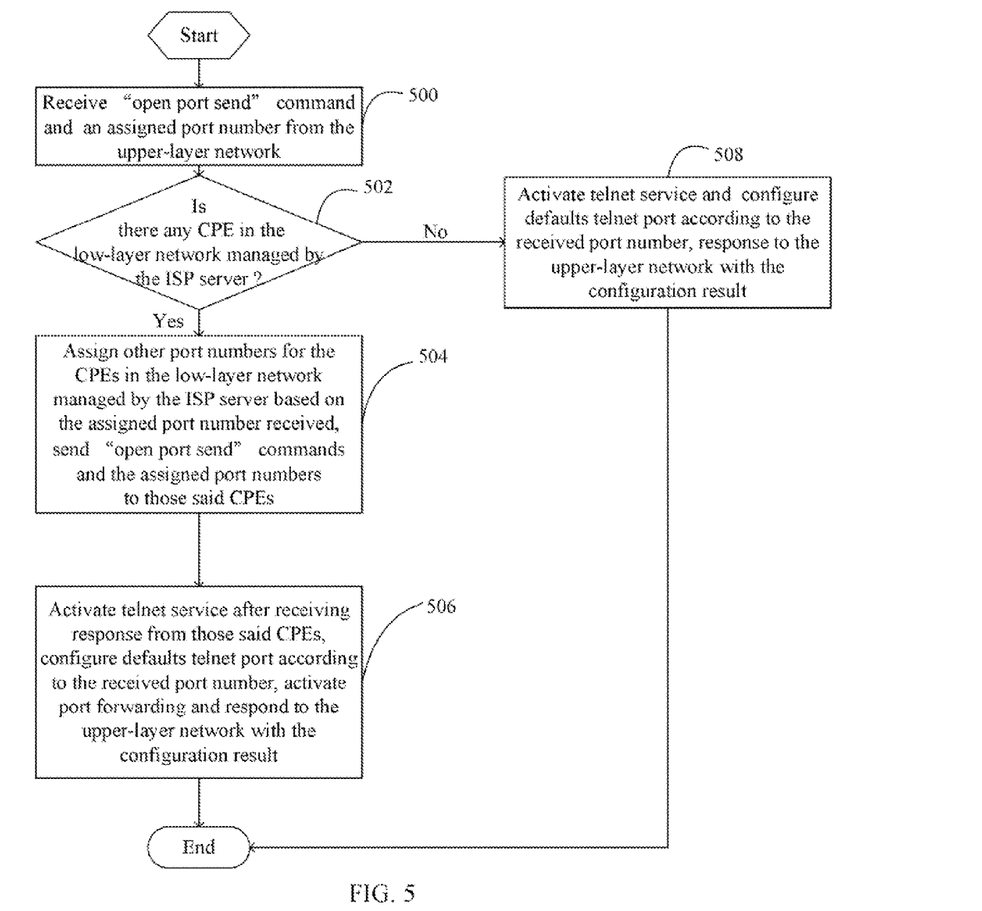
FIG. 5 is a flowchart of one embodiment of port configurations; the flowchart gives details of block 302 and block 304 in FIG. 3.

FIG. 5 is a flowchart of port configurations of CPEs in the present disclosure; the flowchart is details of block 302 and block 304 in FIG. 3. In the described embodiment, the method is carried out in the application environment illustrated in FIG. 1, and is executed by (inter alia) the modules described in FIG. 2.

In block 500, the configuring module 10122 receives an assigned port number and "open port send" command from ISP server 20, in the present embodiment, the assigned port number is port 340, which is randomly assigned for CPE 101 by ISP server 20.

In block 502, the configuring module 10122 determines whether there are any CPEs that are located at the low-layer network that belong to ISP server 20, according to the result of search recorded in database 10125. If yes, then the configuring module 10122 acts as described in block 504. Otherwise, the configuring module 10122 acts as described in block 508.

In block 504, the configuring module 10122 assigns other ports for CPEs that belong to ISP server 20 at the second layer, in the present embodiment, they are CPE 102 and CPE 104. According to the result of search received by the searching module 10121 before and the port number (port 340) assigned for CPE 101, the port number that configuring module 10122 assigns for CPE 102 and CPE 104 are port 344 and port 341, the detail of assigning will be described later. After port distribution has finished, the configuring module 10122 sends "open port send" command to CPE 102 and CPE 104, together with different port numbers assigned to them, requiring CPE 102 and CPE 104 to allocate other ports for CPEs that belong to ISP server 20 at the third layer. The port assignment and configuration continues similarly for CPEs that belong to ISP server 20 locating at other layer of the network. Besides, the result of port distribution and port configuration is stored into database 10125 for further reference.

In detail, port distribution and configuration of CPEs that belong to ISP server 20 in LAN is as follows: if ISP server 20 assigns port 340 to CPE 101, the port numbers that the configuration module 10122 assigns for CPE 102 and CPE 104 can be 341, 342, or 343. The port number which each CPE finally gets is decided by the result of search reported and the port number is incremented sequentially and assigned based the MAC address of each CPE. For example, the result of search that CPE 102 originally reports is 1 while CPE 104 reports 3, and the MAC address of CPE 102 is greater than that of CPE 104, based on the information above, thus the port number assigned to CPE 104 is 340+1=341 and the port number assigned to CPE 102 is 340+1+3=344. Corresponding to CPE 101, CPE 104 assigns port 342 for CPE 105 and port 343 for CPE 106.

In block 506, after receiving "open port send" command and assigned port number from CPE 101, CPE 102 and CPE 104 finish their port distribution and port configuration corresponding to CPE 101, and then respond to CPE 101 with "open port response." After receiving "open port response," the configuring module 10122 activates the telnet service and port forwarding of CPE 101, configuring the default telnet port as port 340. The port-forwarding rule of CPE 101 is: the forwarding of all packages whose destination port matches with any default telnet port of other CPEs that belong to ISP server in the low-layer network, in other words, forwarding all packages whose destination port is in the range of 341-344. After configuration has finished, the configuring module 10122 sends "open port response" as a reply to ISP server 20, reporting port distribution and configuration of all CPEs that belong to ISP server 20 in LAN 10.

In block 508, as there are no CPEs that belong to ISP server 20 located in the low-layer network, it is no need for CPE 101 to assign any port number for other CPEs. The configuring module 10122 directly activates the telnet service and configures the default telnet port as port 340, then responds to ISP server 20 with "open port response," reporting port distribution and configuration of all CPEs that belong to ISP server 20 in LAN 10.

Figure 6:
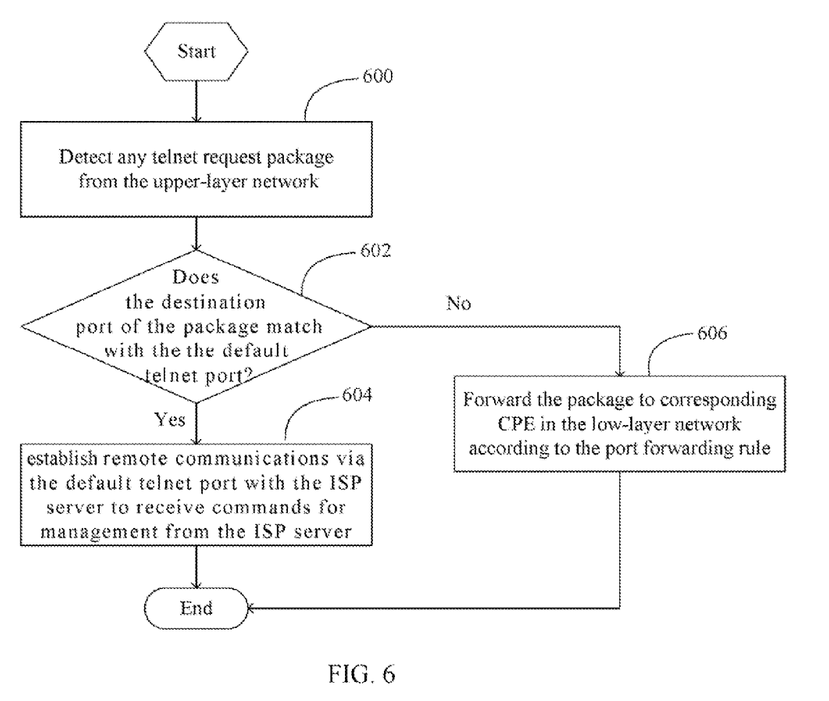
FIG. 6 is a flowchart of one embodiment of a CPE telnet, the flowchart gives details of block 306 in FIG. 3.

Referring to FIG. 6, this is a flowchart of one embodiment of telnet a CPE, the flowchart is details of block 306 in FIG. 3. In the described embodiment, the method is carried out in the application environment illustrated in FIG. 1, and is executed by (inter alia) the modules described in FIG. 2.

In block 600, the login module 10123 monitors any telnet request from ISP server 20 via the default telnet port 340 of CPE 101.

In block 602, the login module 10123 determines whether the telnet request is sent to CPE 101 or not. When the destination port of the telnet request packet matches with the default telnet port of CPE 101, it is considered that this telnet request is sent to CPE 101. In other words, when the destination port of the telnet request packet is 340, it is validated that ISP server 20 requires to telnet CPE 101. Then the login module 10123 acts as described in block 604. If the port match fails, the login module 10123 goes to block 606.

In block 604, the login module 10123 receives this telnet request from ISP server 20 and establishes remote communication with ISP server 20 via port 340 to accept login of ISP server 20 so that ISP server 20 can manage CPE 101.

In block 606, the login module 10123 forwards the telnet request based on the port forwarding rules of CPE 101 (forwarding packets whose destination port is in the range of 341-344) until the telnet request packet reaches a CPE corresponds to the destination port of the telnet request packet.

In at least one embodiment, assuming that CPE 101 communicates with the external Internet via an external IP address of 10.130.21, and the internal IP address for CPE 102 and CPE 104 are 192.168.1.102 and 192.168.1.101 respectively. The process described in FIG. 7 can be described in details as below: when ISP server 20 wants to telnet a CPE in LAN 20, the destination address of the telnet request packet is the external IP of CPE 101 with the default telnet port of required CPE. When the telnet request packet arrives at CPE 101, the login module 10123 forwards the telnet request based on the port forwarding rules after determination, thus going through a destination address conversion process based on the port distribution and configuration of all CPEs. FIG. 10 is an example of a list of destination address conversion in the present embodiment but not as a limitation to the present disclosure. For example, ISP server sends a telnet request packet with destination address of 10.130.21:343 when the required CPE is CPE 106, whose default telnet port is 343. The login module 10123 can covert the original destination address to 192.168.1.101:343 according to table in FIG. 10 based on the port distribution and configuration of all CPEs stored in database 10125, and then forwards the telnet request packet to CPE 104. CPE 104 then forwards the telnet request packet to CPE 106 according to its port forwarding rules after determination. Finally, the telnet request with original destination address of 10.130.21:343 arrives at CPE 106 so that CPE 101 can communicate with ISP server 20 via a telnet link.

Figure 7:
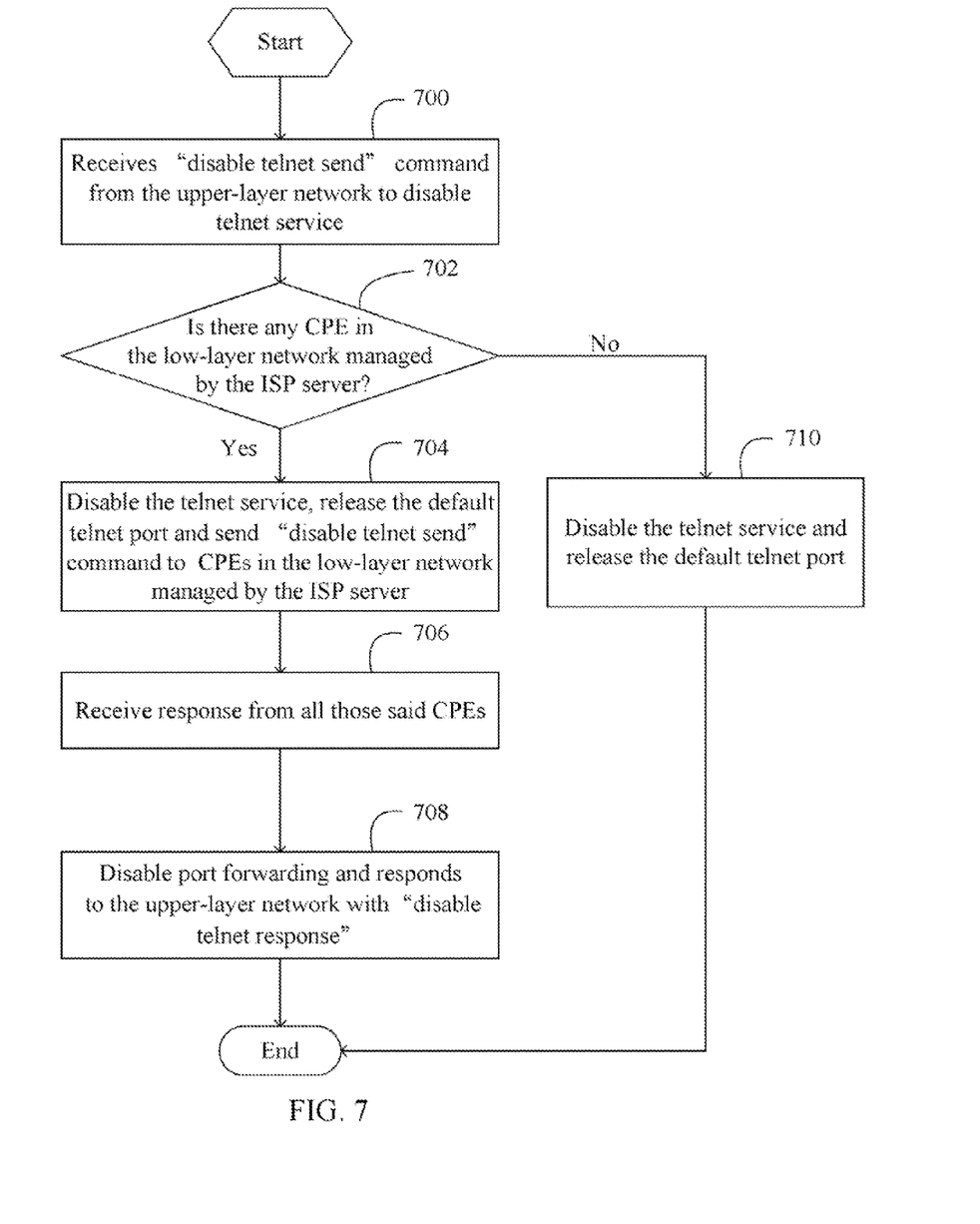
FIG. 7 is a flowchart of one embodiment of disabling the telnet service of a CPE.
Figure 8:
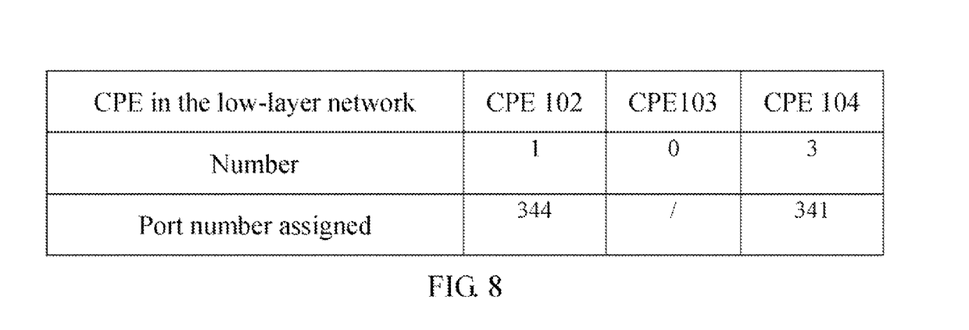
FIG. 8 is a diagram of one embodiment of result of searching received by a CPE in FIG. 1, showing an example of the record of the result of searching.

Referring to FIG. 7, this is a flowchart of one embodiment of disabling the telnet service of a CPE. In the described embodiment, the method is carried out in the application environment illustrated in FIG. 1, and is executed by (inter alia) the modules described in FIG. 2.

In block 700, the disabling module 10124 persistently monitors any command form ISP server 20 until CPE 101 receives "disable telnet send" command from ISP server 20 indicating to all CPEs that belong to ISP server 20 to disable the telnet service.

In block 702, the disabling module 10124 determines whether there are any CPE that belongs to ISP server 20 underlying CPE 101. If the determination is yes, then the process goes to block 704, otherwise the process goes to block 710.

In block 704, the disabling module 10124 disables telnet service of CPE 101, releases the original default telnet port 340. At the same time, the disabling module 10124 forwards "disable telnet send" command to CPE 102 and CPE 104, indicating to them that the telnet service should be disabled as well as resetting the original port configuration to release the corresponding port, which is similar to the procedure for CPE 101.

In block 706, the disabling module 10124 receives "disable telnet response" from CPE 102 and CPE 104 informing that the appropriate operation has been completed.

In block 708, the disabling module 10124 closes port forwarding and sends "disable telnet send" as reply to ISP server 20, informing ISP server 20 that all CPEs belonging to ISP server 20 have disabled the telnet service and the original port configuration has lapsed.

In block 710, the disabling module 10124 disables telnet service of CPE 101 and releases the original default telnet port 340 directly when there are no CPE that belong to ISP server 20 located underlying CPE 101, then sends "disable telnet send" as a reply to ISP server 20.

In at least one embodiment, other CPEs belonging to ISP server 20 operate in the same way as CPE 101 after receiving "disable telnet send" command from the upper-layer network of each one. The only difference is that CPEs in the bottom network have no need to forwards "disable telnet send" nor to close port forwarding because it never opened port forwarding.

In at least one embodiment, the communication between an upper-layer CPE and a low-layer CPE is similar with the communication between CPE 101 and ISP server 20.

In summary, the CPE and remote login method in the present embodiment of the present disclosure is to confirm the number of all CPEs within the scope of the management of ISP server 20 layer by layer, to randomly assigned port as default telnet port of CPEs and open port forwarding as well as activate telnet service of each CPE. Thus, ISP server 20 can telnet a CPE each time through a telnet port that is dynamically assigned, to achieve a single remote connection, while dynamic port also enables remote login more secure.

While various embodiments and methods have been described above, it should be understood that they have been presented by way of example only and not by way of limitation. Thus the breadth and scope of the present disclosure should not be limited by the above-described embodiments. The above-described embodiments are illustrative only, and should not be construed as limiting the following claims.

What is claimed is:

1. A customer premise equipment (CPE) locating in a lower-layer network and an upper-layer network of a local area network (LAN) and in communication with an ISP server, each of the lower-layer network and the upper-layer network comprising other CPEs within the LAN, the CPE comprising: at least one processor; a storage system; and one or more programs that are stored in the storage system and are executed by the at least one processor, the one or more programs including: a searching module that searches other CPEs in the lower-layer network after receiving a searching command from the upper-layer network and reports a number of other CPEs managed by the ISP server in the lower-layer network to the upper-layer network after the number is validated; a configuring module that receives a port number assigned by the upper-layer network and makes port configuration after receiving a configuration command from the upper-layer network, wherein the port configuration comprises: activating telnet service of the CPE, configuring a default telnet port according to the assigned port number, assigning other port numbers to the other CPEs managed by the ISP server in the lower-layer network based on the assigned port number and the number reported, sending the port numbers assigned and configuration commands to the other CPEs managed by the ISP server in the lower-layer network; and a login module that monitors a telnet request from the upper-layer network via the default telnet port and establishes a remote communication with the ISP server via the default telnet port when a destination port of the telnet request matches with the default telnet port.

2. The CPE of claim 1, further comprising a disabling module that disables the telnet service of the CPE and releases the default telnet port after receiving a disabling command from the upper-layer network.

3. The CPE of claim 1, wherein the CPE communicates with the ISP server and receives the searching command, the configuration command and the telnet request from the ISP server when the CPE is the root node of the LAN, and the port number that assigned to the CPE is randomly assigned by the ISP server.

4. The CPE of claim 2, wherein the configuring module further activates port forwarding and the login module further forwards the telnet request if the destination port of the telnet request doesn't match with the default telnet port of the CPE when the CPE is not a leaf node of the LAN.

5. The CPE of claim 4, wherein the disabling module further sends disabling commands to the other CPEs managed by the ISP server in the lower-layer network and disables the port forwarding of the CPE.

6. The CPE of claim 1, wherein the configuring module further receives responses with results of port assigning and configuring from the other CPEs managed by the ISP server in the lower-layer network, responds to the upper-layer network with another result of port assigning and configuring after packing up the results of port assigning and configuring from the other CPEs managed by the ISP server in the lower-layer network.

7. A method of remote login, applied in a CPE that communicates with a lower-layer network and an upper-layer network of a local area network (LAN), each of the lower-layer network and the upper-layer network comprising other CPEs within the LAN that communicates with an ISP server, the method comprising: searching other CPEs in the lower-layer network after receiving searching a command from the upper-layer network and reporting a number of other CPE managed by the ISP server in the lower-layer network to the upper-layer network after the number is validated; receiving a port number assigned by the upper-layer network and making port configuration after receiving a configuration command from the upper-layer network, wherein the port configuration comprises: activating telnet service of the CPE, configuring a default telnet port according to the assigned port number, assigning other port numbers to the other CPEs managed by the ISP server in the lower-layer network based on the assigned port number and the number reported, sending the port numbers assigned and configuration commands to the other CPEs managed by the ISP server in the lower-layer network; and monitoring a telnet request from the upper-layer network via the default telnet port and establishing a remote communication with the ISP server via the default telnet port when a destination port of a telnet request package matches with the default telnet port.

8. The method of claim 7, further comprising:
disabling the telnet service of the CPE and releasing the default telnet port after a receiving disabling command from the upper-layer network.

9. The method of claim 7, when the CPE is the root node of the LAN, the method further comprising: communicating with the ISP server; and receiving the searching command, the configuration command and the telnet request from the ISP server and the port number that assigned to the CPE is randomly assigned by the ISP server.

10. The method as described in claim 8, wherein when the CPE is not a leaf node of the LAN, the method further comprises: activating port forwarding; and forwarding the telnet request if the destination port of the telnet request doesn't match with the default telnet port of the CPE.

11. The method as described in claim 10, further comprising: sending disabling commands to the other CPEs managed by the ISP server in the lower-layer network and disabling the port forwarding of the CPE.

12. The method as described in claim 7, further comprising: receiving responses with results of port assigning and configuring from the other CPEs managed by the ISP server in the lower-layer network; and responding to the upper-layer network with another result of port assigning and configuring after packing up the results of port assigning and configuring from the other CPEs managed by the ISP server in the lower-layer network.

* * * * *